United States Patent
Hochtritt et al.

(10) Patent No.: US 7,939,159 B2
(45) Date of Patent: May 10, 2011

(54) STACK OF INTERFOLDED ABSORBENT SHEET PRODUCTS

(75) Inventors: Robert C. Hochtritt, Neenah, WI (US); Andrew M. Conger, Neenah, WI (US)

(73) Assignee: SCA Tissue North America LLC, Neenah, WI (US)

(*) Notice: Subject to any disclaimer, the term of this patent is extended or adjusted under 35 U.S.C. 154(b) by 0 days.

(21) Appl. No.: 12/577,988

(22) Filed: Oct. 13, 2009

(65) Prior Publication Data

US 2010/0025420 A1 Feb. 4, 2010

Related U.S. Application Data

(63) Continuation of application No. 12/055,334, filed on Mar. 26, 2008, now Pat. No. 7,611,765, which is a continuation of application No. 10/660,694, filed on Sep. 12, 2003, now abandoned.

(51) Int. Cl.
  *B32B 3/04* (2006.01)
(52) U.S. Cl. .......................... 428/126; 428/130
(58) Field of Classification Search .................. 428/126, 428/130; 221/48; 206/494
  See application file for complete search history.

(56) References Cited

U.S. PATENT DOCUMENTS

| | | |
|---|---|---|
| 1,427,420 A | 8/1922 | Sargent |
| 1,632,446 A | 10/1925 | Kreueger |
| 1,666,553 A | 10/1927 | Christman |
| 3,285,599 A | 11/1966 | Pherson et al. |
| 3,291,479 A | 12/1966 | Greiner et al. |
| 4,638,921 A | 1/1987 | Wolfson et al. |
| 5,118,554 A | 6/1992 | Chan et al. |
| 5,131,561 A | 7/1992 | Casperson et al. |
| 5,300,347 A | 4/1994 | Underhill et al. |
| 5,516,000 A | 5/1996 | Freiburger et al. |
| 5,736,224 A | 4/1998 | Dodge |
| 5,755,413 A | 5/1998 | Press |
| 5,891,008 A | 4/1999 | Bavely et al. |
| 6,090,467 A | 7/2000 | Yip |
| 6,168,848 B1 | 1/2001 | Heath |
| 6,213,346 B1 | 4/2001 | Skerrett et al. |
| 6,334,544 B1 | 1/2002 | Christensen et al. |
| 6,415,949 B1 | 7/2002 | Tramontina |
| D462,530 S | 9/2002 | Almvik et al. |
| 6,520,330 B1 | 2/2003 | Batra |
| 6,602,575 B2 | 8/2003 | Lefevre Du Grosriez et al. |
| 6,623,833 B2 | 9/2003 | Chan |
| 6,699,360 B2 | 3/2004 | Heath et al. |
| 6,745,917 B2 | 6/2004 | Koyama et al. |
| 7,611,765 B2 | 11/2009 | Hochtritt et al. |
| 2010/0055391 A1 | 3/2010 | Penfield |

FOREIGN PATENT DOCUMENTS

| | | |
|---|---|---|
| EP | 0 302 382 | 2/1989 |
| EP | 0 286 538 | 1/1992 |

*Primary Examiner* — Alexander Thomas
(74) *Attorney, Agent, or Firm* — Young & Thompson

(57) ABSTRACT

A stack of interfolded absorbent sheet products comprises a plurality of absorbent sheets each of which is itself folded at least twice about axes that are perpendicular to one another. The absorbent sheets have an embossed surface relief of a predetermined pattern or design. Each of the absorbent sheets within the stack comprises at least one pair of panels sandwiched between a pair of adjacent panels of another of the absorbent sheets in the stack.

17 Claims, 5 Drawing Sheets

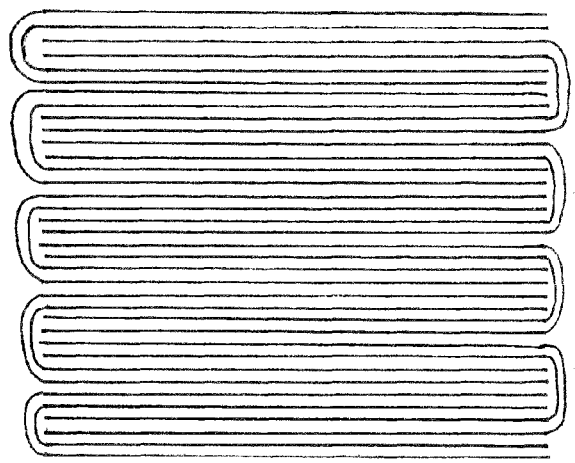
Fig 1(a)  Fig 1(b)
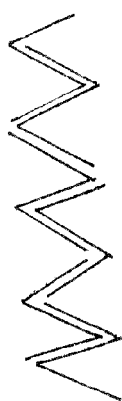
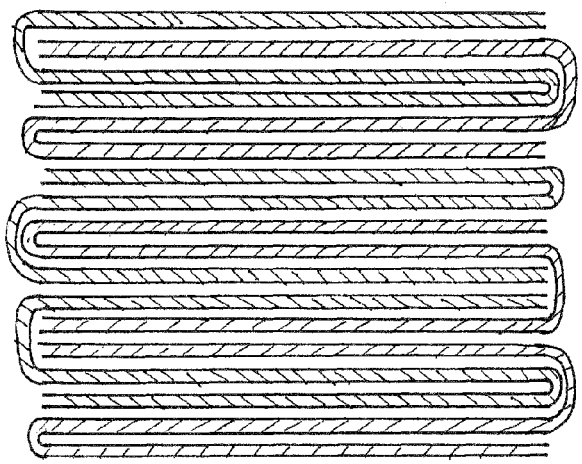
Fig 2(a)  Fig 2(b)

STACK OF INTERFOLDED ABSORBENT SHEET PRODUCTS

This application is a continuation of U.S. application Ser. No. 12/055,334, filed Mar. 26. 2008, now U.S. Pat. No. 7,611, 765, which is a continuation of U.S. application Ser. No. 10/660,694, filed Sep. 12, 2003, now abandoned.

BACKGROUND OF THE INVENTION

1. Field of the Invention

The invention relates to a stack of interfolded absorbent sheet products, and preferably, but not necessarily, to a stack of interfolded paper napkins bearing a predetermined pattern imparted by embossing or by formation by the Through-Air Drying ("TAD") technique.

2. Description of Related Art

In commercial food service establishments and public restrooms, folded paper products such as paper napkins are typically provided in dispensers from which the products may be withdrawn by the patrons of those establishments. Whereas the highest quality paper napkins are invariably "server-controlled," i.e., delivered individually by a waiter or waitress, it is nevertheless desired to provide paper products in the user-dispensed application that are perceived as being of relatively higher quality.

Interfolded paper products, and especially interfolded paper napkins, have the advantage that they can be loaded into a dispenser whose faceplate cooperates with the stack of napkins to encourage users to remove napkins one at a time. This results in users taking fewer napkins than if it were possible or encouraged to remove a group of napkins simultaneously, although the paper product stack according to the invention may be used in dispensers that promote either one at a time or group dispensing.

Interfolded paper napkins applied to a user-dispensed environment are principally single folded only, in the marketplace at present. Patent literature describes a variety of arrangements of interfolded paper napkins having plural parallel folds, for example, in U.S. Pat. Nos. 5,118,554, 6,090,467 and 6,213,346.

Paper napkins that are single folded only (sometimes also called "half-folded" when the fold bisects the napkin, or "off-folded" when it does not) have the disadvantage that, in order to achieve a given total absorbency, the basis weight of the unfolded napkin sheet must be relatively high. This in turn causes the napkin to have relatively low softness and drape properties, both of which properties are important to the user's perception of the total quality of the napkin. The provision of plural parallel folds in a napkin has the obvious limitation that the napkin will have a relatively elongated shape in the direction parallel to the folds, unless the starting blank is cut to a relatively more elongated shape in the direction perpendicular to the folds.

SUMMARY OF THE INVENTION

It is therefore an object of the invention to address and alleviate, at least in part, the disadvantages described above in connection with the prior art, by providing a stack of interfolded absorbent sheet products, each of which products is itself folded at least twice about axes that are perpendicular to one another, the products moreover comprising a surface relief of a predetermined pattern or design imparted by embossing or by TAD formation.

The folded absorbent sheet products according to the invention are preferably single ply paper napkins having a basis weight of from about 10 to 20 lb per unfolded sheet. More preferably, the basis weight of the napkins according to the invention is from about 11 to about 17 lb, still more preferably from about 12 to about 15 lb, and most preferably about 13 lb. The expression of basis weight in pounds as used herein is with reference to a stack of 500 unfolded single ply sheets each measuring 24 by 36 inches.

The term "absorbent sheet products" as used herein embraces not only paper products such as paper napkins, but also absorbent nonwoven materials not normally classed as papers or tissues. Such nonwoven materials include pure nonwovens and hybrid nonwoven/pulp webs whose properties are similar to those of tissue paper, but which are based for example on nonwoven or airlaid materials containing low amounts of synthetic fibers, binders, wet strength agents and the like. An example of such a material would be a wetlaid or foam-formed hydraulically entangled nonwoven material comprising at least 30% by weight pulp fibers and at least 20% by weight manmade fibers or filaments.

In one embodiment, the folded absorbent sheet products are paper napkins each having two folds, the two folds each bisecting the napkin and being perpendicular to one another. Such a napkin is referred to herein as a "quarter folded" napkin, in that the folded napkin is about one quarter the size of the unfolded sheet. Such a napkin may also be considered as a "four-panel" napkin, in that the perpendicular folds delineate four regions in the initial napkin sheet.

Other contemplated embodiments of the invention include six panel and eight panel napkins. Four example, in a six panel napkin, the initial sheet comprises one fold in the longitudinal direction of the sheet and two folds in the transverse direction, such that the resulting folded sheet comprises six equally sized panels. The eight panel napkin has a similar structure, but with three parallel folds in the transverse direction. In the case of eight equally sized panels, the final two folds may be generated simultaneously, by folding a quarter-folded napkin once again in half.

The folded absorbent sheet products according to the invention are preferably discrete, that is, entirely detached from one another. However, it is also within the scope of the invention that the stack of absorbent sheet products be interconnected by "tabs", with the pulling force at the time of withdrawing a single absorbent sheet product through a dispensing opening being greater than or equal to the force required to tear the tabs connecting adjacent absorbent sheet products.

The interfolding arrangement described herein recommends that the stack of absorbent sheet products be formed in a pair of parallel "lanes", such that, when the products are interconnected by tabs, it is in fact alternate absorbent sheet products that are joined together, rather than consecutive absorbent sheet products.

The invention also contemplates the use of the novel stack of absorbent sheet products in a variety of dispensers. At present, a dispenser having downwardly-directed opening is preferred, in which the stack of absorbent sheet products is oriented at one or more angles that are oblique or vertical. However, the stack of interfolded absorbent sheet products may also be used in conjunction with a dispenser having an upwardly directed opening, or a lateral opening.

BRIEF DESCRIPTION OF THE DRAWINGS

Other objects, features and advantages of the invention will become more apparent after reading the following detailed description of preferred embodiments of the invention, given with reference to the accompanying drawings, in which:

FIG. 1(a) is a schematic representation of the interfold configuration of a stack of folded absorbent sheet products according to a first embodiment of the invention;

FIG. 1(b) is a schematic cross-sectional view of the napkin stack of the FIG. 1(a) embodiment;

FIG. 2(a) is a schematic representation of the interfold configuration of a stack of folded absorbent sheet products according to a second embodiment of the invention;

FIG. 2(b) is a schematic cross-sectional view of the napkin stack of the FIG. 2(a) embodiment;

DETAILED DESCRIPTION OF PREFERRED EMBODIMENTS

Figure 6:
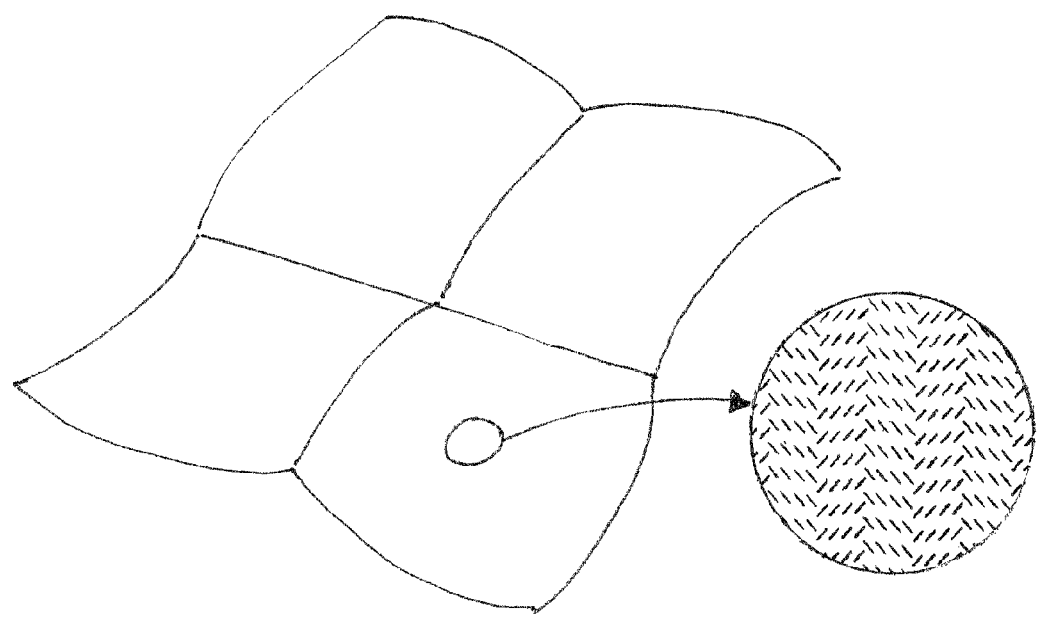
FIG. 6 is a perspective view of an individual unfolded napkin according to the FIGS. 1(a) and 1(b) embodiment.

FIGS. 1(a), 1(b) and 6 depict the above-discussed "quarter-folded" embodiment of the invention. As seen in FIGS. 1(a) and 1(b), the interfolding of adjacent sheets is such that any given napkin within the stack receives, between a pair of adjacent panels of the given napkin, a pair of adjacent panels of each of an upper and a lower napkin within the stack.

Such an interfolding arrangement is shown in the context of single folded paper towels, in U.S. Pat. Nos. 1,427,420 and 1,632,446. A quarter-fold interfold arrangement has been described before in connection with pop-up tissue dispensers (see EP 0 286 538 B1 and EP 0 302 382 A1). Web interfolding machines are described in U.S. Pat. Nos. 3,285,599 and 3,291,479, the entireties of which patents are hereby expressly incorporated by reference.

Whereas the embossed folded absorbent sheet products according to the invention are preferably paper napkins, as discussed in U.S. Pat. No. 5,300,347, facial tissue is rarely embossed. The embossed facial tissue described in that patent not being disclosed as a folded or interfolded product, whereas in the two European patent documents identified above, the facial tissue described therein is not disclosed to be embossed.

FIG. 6 illustrates that the folded and interfolded absorbent sheet products according to the invention are embossed. As used herein, the term "embossed" connotes a three-dimensional low relief pattern of a distinct pattern or image. Such embossing may be applied by conventional embossing rollers during the converting phase of the napkin manufacturing, preferably upstream of the folding and interfolding, and/or may be formed by a selected pattern of the TAD fabric, if the napkins are made by the TAD technique. The term "embossed" as used herein does not embrace, however, any incidental surface roughness imparted to a napkin sheet by the forming fabric used in a traditional Yankee cylinder/dry crepe forming line, which surface roughness does not display any predetermined pattern to the unaided eye.

The specific pattern embossed onto the napkins according to the invention is not critical, with that illustrated by way of example in FIG. 6 being as shown in commonly-owned U.S. Design Pat. No. D462,530. The embossing may be of a continuous pattern over the entire surface of the sheet, as is the case for FIG. 6, or the embossing may be applied to selected regions of the sheet, e.g. along a periphery or a border thereof.

When the absorbent sheet products according to the invention are to be used in a food establishment, particularly a fast food franchise, it is contemplated that the embossing might take the form of a logo of the restaurant in which the napkins will be used, either alone or in combination with a decorative border.

The basis weight of the absorbent sheet products according to the invention is preferably within the range of a high quality napkin, and thus less than that of commercially available single folded paper products, whose higher basis weight places them closer to the category of paper towels. The embodiment of FIGS. 1(a), 1(b) and 6 has a basis weight of about 13 lb, calculated as defined above. However, it will be appreciated by those skilled in the art that the basis weight may vary over a broader range, from about 10 to 20 lb per unfolded sheet, more preferably from about 11 to about 17 lb, and still more preferably from about 12 to about 15 lb.

While this range of basis weights is greater than that commonly used for facial tissue (wherein a basis weight of 8½ to 9 per ply is typical), it is distinctly less than the basis weights found in commercially available single-fold napkin/towels, which tend to have basis weights in excess of 20 lb. Thus, by providing a paper napkin wherein the sheet has a relatively low basis weight, yet the napkin is folded to have at least four panels, the invention provides a napkin that is comparatively softer and has improved drape properties in relation to single fold products.

The paper napkin of FIGS. 1(a), 1(b) and 6 is formed from a single ply whose dimensions are preferably about 8½"×13", such that the folded napkin will have dimensions of about 4¼×6½". Obviously, these dimensions may be varied to suit the particular application in question. FIGS. 1(a) and 1(b) are taken in planes parallel to the short sides of the napkin stack. FIG. 1(b) illustrates the point that each napkin is folded not only as shown in the figure, but also about a perpendicular line of folding parallel to or coincident with the plane of the drawing. Therefore, the folds visible in FIGS. 1(a) and 1(b) are those extending across the long dimension of the napkins, whereas the folds not visible are those extending across the short dimension of the napkins.

With reference to FIG. 1(b), it will be appreciated that, in this embodiment, each napkin within the stack receives between its two inwardly facing adjacent panels a pair of adjacent panels from each of two napkins disposed respectively above and below it in the stack.

In the six-panel embodiment of FIGS. 2(a) and 2(b), on the other hand, the uppermost napkin has its four lower panels sandwiched between two adjacent panels of the next lower napkin in the stack, whose lower four panels are in turn sandwiched between the lowermost two panels of the top napkin, and the uppermost two panels of the third napkin. In FIG. 2(b) (and also in FIG. 3(b)), the cross-sectional lines are added to aid visual differentiation of adjacent panel pairs, but are not intended to reflect a solid thickness.

Figure 3A:
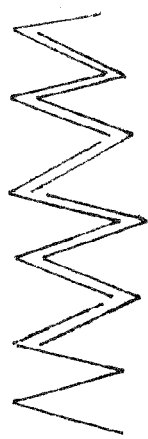
FIG. 3(a) is a schematic representation of the interfold configuration of a stack of folded absorbent sheet products according to a third embodiment of the invention.
Figure 3B:
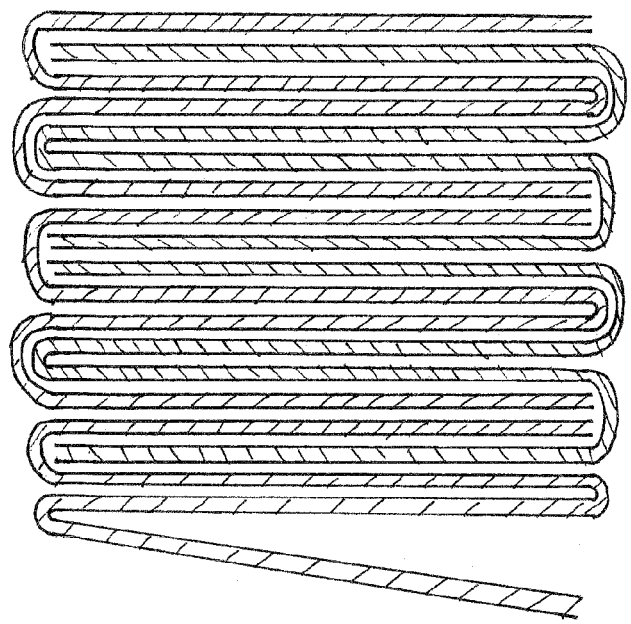
FIG. 3(b) is a schematic cross-sectional view of the napkin stack of the FIG. 3(a) embodiment.

In the eight-panel embodiment of FIGS. 3(a) and 3(b), the uppermost napkin has its four middle panels sandwiched between two of the upper four panels of the second napkin in the stack, whereas the four middle panels of the second napkin are sandwiched between two of the four lowermost panels of the first napkin. The two lowermost panels of the second napkin and the two uppermost panels of the fourth napkin are sandwiched between two of the four uppermost panels of the third napkin.

Figure 4:
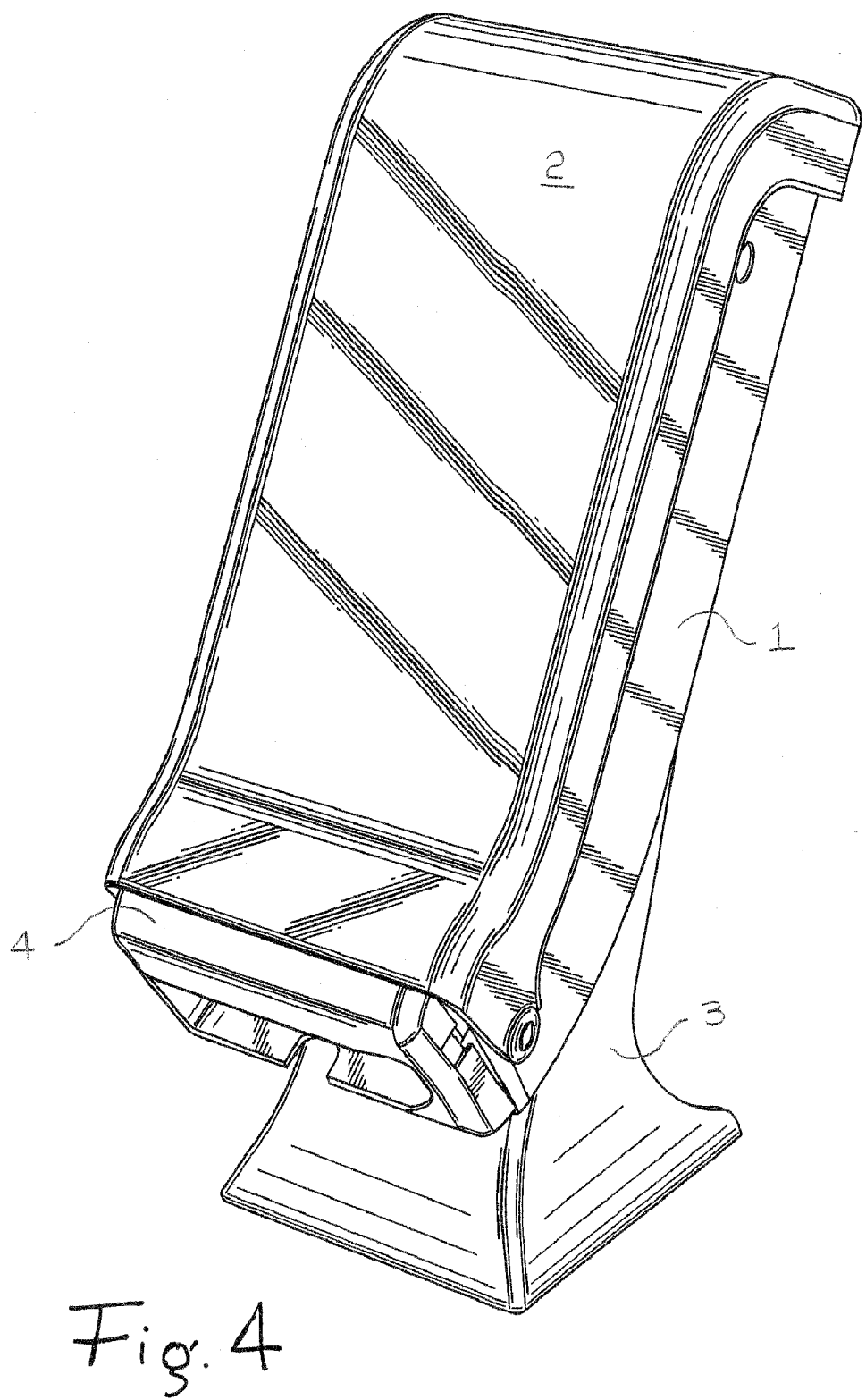
FIG. 4 is a perspective view showing an embodiment of a dispenser for holding and dispensing one-by-one the stack of absorbent sheet products according to the invention.

The principal components of a dispenser that is preferred for use in dispensing the napkin stacks according to the invention, as shown in FIG. 4, include a main dispenser body portion 1, which terminates downwardly in a faceplate 4 having a dispensing opening through which napkins are withdrawn one-by-one. The faceplate 4 is preferably removable from the body portion 1, for example as shown in FIG. 3.

A cover 2 closes the front of the main body portion 1, and is openable to permit reloading of fresh napkins into the main body portion 1. The cover 2 is preferably transparent, so that the quantity of napkins remaining in the dispenser can be observed without the need to open the same; whereas the main body portion 1 is preferably opaque.

A stand 3 supports the dispenser on an underlying horizontal surface, and also positions the dispenser at the desired angle relative to such surface. The stand 3 is preferably also removable from the body portion 1, as shown in FIG. 3, which provides advantages discussed herein; however, the stand 3 could also be formed in one piece with, or permanently secured to, the main body portion 1.

Figure 5:
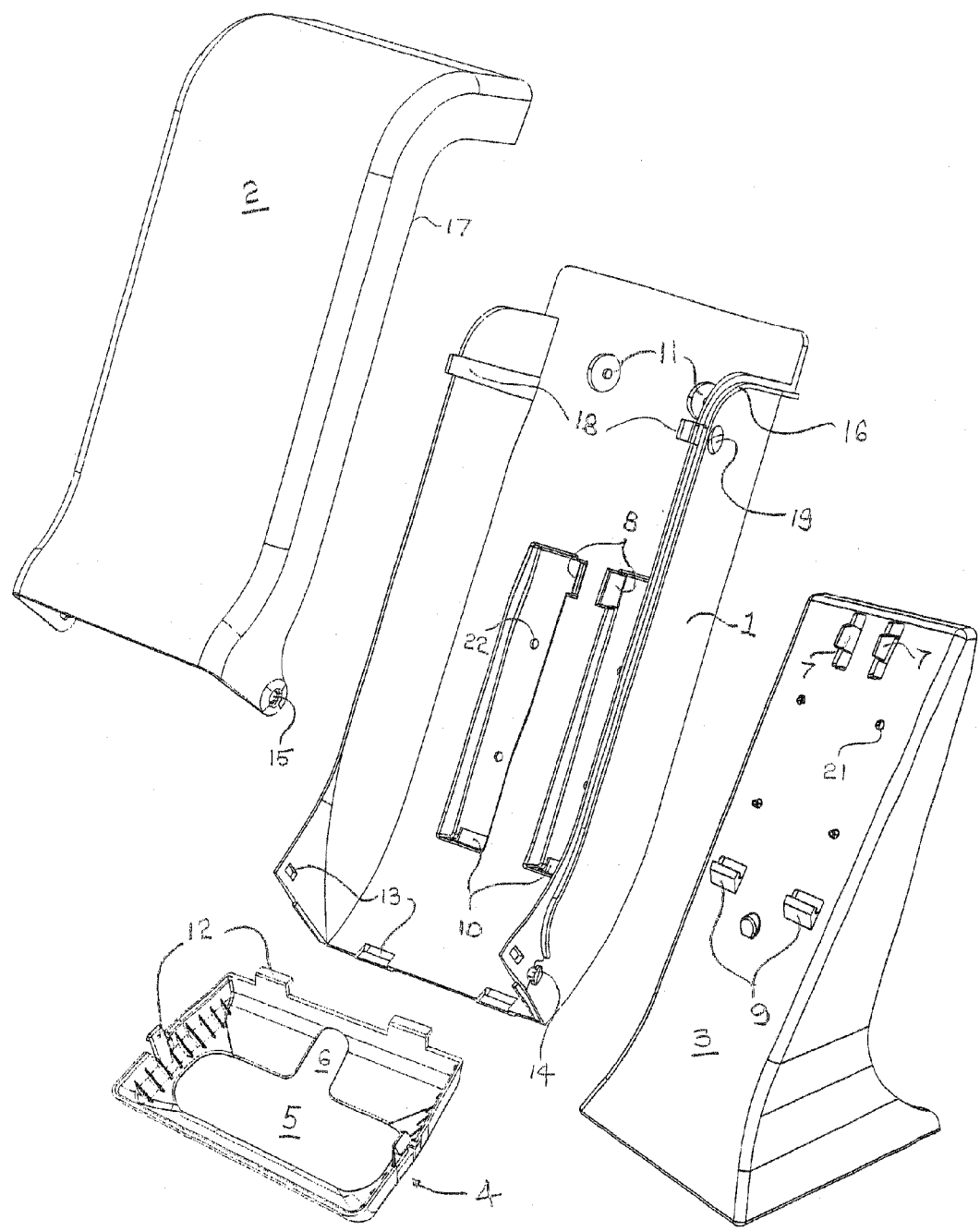
FIG. 5 is an exploded perspective view showing the principal components of the dispenser according to FIG. 4.

The dispenser body and stand shown in FIGS. 4 and 5 is that presently preferred by the inventors; however, the invention is applicable to a variety of other dispenser shapes and types; consequently, the accompanying claims that are directed to the absorbent sheet product stack do not require the presence of a dispenser, and the accompanying claims that recite a dispenser in combination with a absorbent sheet product stack are not intended to be limited to any particular dispenser shape or type, unless the claim so states.

The exploded view of FIG. 5 shows a number of advantageous structural details of the FIG. 4 dispenser. All of the components are preferably formed of injection-molded plastic. The various connecting structures of the component parts thereby have sufficient inherent resiliency to deform enough to enter the mating parts on the adjacent component, for ease of assembly and disassembly.

The transparent cover 2 is connected to the main body portion 1 via the slotted openings 15, which fit over the flanged bosses 14 formed on the main body portion 1. Only one opening/boss pair 14, 15 is visible in FIG. 2; however, the dispenser of this embodiment is symmetrical about a longitudinal bisecting plane parallel to its sides. The cover can be opened by pivoting it about the common axis of the bosses 14 and openings 15. The range of angular movement of the cover 2 relative to the main body portion 1 permits fully exposing the interior of the main body portion 1, thereby to allow unimpeded access for refilling the dispenser.

Cleats 18 snap fit to the inside edge portions of cover 2 to hold the cover in the closed position. Those cleats can be released by exerting inwardly-directed pressure on the depressions 19 formed on the outside of the main body portion 1.

The cover 2 of this embodiment also has an inner width slightly greater than the outer width of the main body portion 1, so that the two components overlap in the closed position. The main body portion 1 therefore includes a laterally-outwardly projecting flange 16 on one or both sides, which registers with the complementary-shaped edge 17 of the cover 2, and serves as a secure stop in the closed position.

The main body portion 1 is closed at its lower end by the one-by-one faceplate 4 having a dispensing opening 5. The faceplate 4 cooperates with the stack of napkins held within the dispenser to permit one-at-a-time dispensing of such napkins, as will be described in greater detail below. The faceplate 4 is detachably connected to the main body portion 1 by resilient cleats 12 that mate with corresponding slots 13 formed on the main body portion 1.

The main body portion 1 is detachably connected to the stand 3 by a combination of brackets 9 on the stand that engage slots 10 on the main body portion 1, resilient cleats 7 on the stand 3 that snap fit into corresponding openings 8 on the main body portion 1, and round projections 21 on the stand 3 that engage openings 22 on the main body portion 1 to ensure a correct positional registration.

The main body portion 1 also includes recessed openings 11 that permit the main body portion 1 to be fastened to a vertical support surface. In that case, the stand 3 would not be used. The dispenser of this embodiment may therefore be positioned on a horizontal surface by using the stand 3, or mounted on a vertical surface, without the stand 3. In use, the napkin stack is loaded into the dispenser with the cover 2 in open position, after which the cover 2 is closed. When the one-by-one face plate 4 is used, a first napkin is withdrawn in whole or in part through the dispensing opening 5, with the aid of the side extension 6 thereof. The interfolding causes two adjacent panels of the next napkin to project through the dispensing opening, such that a user will be able to take only one napkin at a time. This dispensing mode discourages users from withdrawing more napkins than are needed, and correspondingly reduces waste. When the dispenser is almost empty, the transparent cover 2 will reveal that condition to employees of the establishment, so that the dispenser can be refilled.

While the present invention has been described in connection with various preferred embodiments thereof, it is to be understood that those embodiments are provided merely to illustrate the invention, and should not be used as a pretext to limit the scope of protection conferred by the true scope and spirit of the appended claims.

What is claimed is:

1. A stack of interfolded absorbent sheet products, comprising a plurality of absorbent sheets each of which is itself folded at least twice about axes that are perpendicular to one another, the absorbent sheets moreover comprising an embossed surface relief of a predetermined pattern or design,
    wherein each of said absorbent sheets within said stack comprises at least one pair of panels sandwiched between a pair of adjacent panels of another of said absorbent sheets within said stack,
    wherein each of said absorbent sheets is a paper napkin having a first fold bisecting the napkin into two equal parts and at least one second fold perpendicular to said first fold, said second fold defining said pair of adjacent panels and dividing said first fold into a first portion positioned above said at least one pair of panels and a second portion positioned below said at least one pair of panels,
    wherein each of said absorbent sheets is entirely detached from all other absorbent sheets within said stack,
    wherein said at least one second fold is disposed parallel to and offset from a plane that is perpendicular to said first fold and bisects said absorbent sheet product, and
    wherein each napkin within said stack is oriented oppositely from each preceding and succeeding napkin within said stack.

2. The stack of interfolded absorbent sheet products according to claim 1, wherein each of said absorbent sheets is a single ply paper napkin.

3. The stack of interfolded absorbent sheet products according to claim 1, wherein each of said absorbent sheets is a single ply paper napkin having a basis weight of from about 10 to 20 lb.

4. The stack of interfolded absorbent sheet products according to claim 3, wherein said basis weight is from about 11 to about 17 lb.

5. The stack of interfolded absorbent sheet products according to claim 4, wherein said basis weight is from about 12 to about 15 lb.

6. The stack of interfolded absorbent sheet products according to claim 5, wherein said basis weight is about 13 lb.

7. The stack of absorbent sheet products according to claim 1, wherein each of said absorbent sheets when unfolded has dimensions of approximately 8.5 inches by 13 inches.

8. The stack of absorbent sheet products according to claim 7, wherein each of said absorbent sheets when folded has a rectangular configuration having a long side measuring approximately 6.5 inches.

9. A stack of interfolded absorbent sheet products, comprising a plurality of absorbent sheets each of which is itself folded at least twice about axes that are perpendicular to one another, the absorbent sheets moreover comprising an embossed surface relief of a predetermined pattern or design,
wherein each of said absorbent sheets within said stack comprises at least one pair of panels sandwiched between a pair of adjacent panels of another of said absorbent sheets within said stack,
wherein each of said absorbent sheets is a rectangular paper napkin having two shorter edges and two longer edges, a first fold parallel to the two shorter edges bisecting the napkin into two equal parts, and at least one second fold perpendicular to the first fold parallel to said two longer edges,
wherein said second fold defines said pair of adjacent panels and divides said first fold into a first portion positioned above said at least one pair of panels and a second portion positioned below said at least one pair of panels, and
wherein each napkin within said stack is oriented oppositely from each preceding and succeeding napkin within said stack.

10. The stack of interfolded absorbent sheet products according to claim 9, wherein each of said absorbent sheets is a single ply paper napkin.

11. The stack of interfolded absorbent sheet products according to claim 9, wherein each of said absorbent sheets is a single ply paper napkin having a basis weight of from about 10 to 20 lb.

12. The stack of interfolded absorbent sheet products according to claim 11, wherein said basis weight is from about 11 to about 17 lb.

13. The stack of interfolded absorbent sheet products according to claim 12, wherein said basis weight is from about 12 to about 15 lb.

14. The stack of interfolded absorbent sheet products according to claim 13, wherein said basis weight is about 13 lb.

15. The stack of absorbent sheet products according to claim 9, wherein each of said absorbent sheets when unfolded has dimensions of approximately 8.5 inches by 13 inches.

16. The stack of absorbent sheet products according to claim 15, wherein each of said absorbent sheets when folded has a rectangular configuration having a long side measuring approximately 6.5 inches.

17. The stack of absorbent sheet products according to claim 9, wherein said at least one second fold is disposed parallel to and offset from a plane that is perpendicular to said first fold and bisects said absorbent sheet product.

* * * * *